US011684047B2

(12) United States Patent
Kim

(10) Patent No.: US 11,684,047 B2
(45) Date of Patent: Jun. 27, 2023

(54) WATER QUALITY CONVERTER

(71) Applicant: Sung Kyung Kim, Gyeongsangnam-do (KR)

(72) Inventor: Sung Kyung Kim, Gyeongsangnam-do (KR)

( * ) Notice: Subject to any disclaimer, the term of this patent is extended or adjusted under 35 U.S.C. 154(b) by 154 days.

(21) Appl. No.: 17/333,647

(22) Filed: May 28, 2021

(65) Prior Publication Data

US 2021/0400929 A1     Dec. 30, 2021

(30) Foreign Application Priority Data

Jun. 28, 2020   (KR) ........................ 10-2020-0078886

(51) Int. Cl.
*A01K 63/04*   (2006.01)
*C02F 1/68*    (2023.01)
*C02F 103/02*  (2006.01)

(52) U.S. Cl.
CPC .............. *A01K 63/04* (2013.01); *C02F 1/687* (2013.01); *A01K 63/045* (2013.01); *C02F 1/68* (2013.01); *C02F 2103/02* (2013.01)

(58) Field of Classification Search
CPC ....... A01K 63/04; A01K 63/045; C02F 1/687; C02F 1/68; C02F 2103/02
USPC ................ 210/153, 167.01, 167.21; 119/259
See application file for complete search history.

(56) References Cited

U.S. PATENT DOCUMENTS

| 2005/0120970 A1* | 6/2005 | Massingill ............. A01K 63/10 |
| | | 119/216 |
| 2015/0083653 A1* | 3/2015 | Marcolongo ........... C02F 1/505 |
| | | 210/198.1 |

FOREIGN PATENT DOCUMENTS

| KR | 101450078 | 10/2014 |
| KR | 20180000129 | 1/2018 |
| KR | 20180113373 | 10/2018 |
| TW | M318317 U | * 9/2007 |

OTHER PUBLICATIONS

Machine-generated English Tranlsation of TW M318317 U, translated on Dec. 21, 2022.*

* cited by examiner

*Primary Examiner* — Fred Prince
(74) *Attorney, Agent, or Firm* — IPLA P.A.

(57) ABSTRACT

A water quality converter includes: a container having an oval hollow, where the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed, and a weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5.

2 Claims, 2 Drawing Sheets

A photo of a water quality converter

A photo of a water quality converter

A photo of a fishbowl with water

Another photo of a fishbowl with water

WATER QUALITY CONVERTER

BACKGROUND

The present invention relates to a water quality converter, and more particularly, to a water quality converter which converts water quality to contain minerals in water for a fishbowl and to preserve the water quality for a long time with purification capacity, thereby helping health, growth and development of fish.

In general, water is liquid without color, smell and taste at room temperature, and is a combination of oxygen and hydrogen chemically. Such water is the most essential material for all living things including human beings. Especially, in various parts of the human body, the proportion of water in the blood is 80%, the proportion of water in the heart is about 79%, and those in the spleen, in muscles, and the brain are about 75%. Therefore, water as well as oxygen, is the most essential element for the survival of the human beings.

Recently, research results show that water containing minerals is good for health. Minerals are essential nutrients involved in various metabolism activities, and must be taken from the outside since not being produced in the human body itself.

However, when a person drinks tap water, it is difficult to perfectly purify the tap water or to remove harmful heavy metals even though the person uses a water purifier or boils the tap water to drink it.

Meanwhile, water containing minerals also helps the health, growth and development of fish, and it is important to purify water to prevent pollution of water since fish carry out the metabolic activity.

Recently, many people raise fish in a fishbowl as a hobby. The fishbowl is generally filled with tap water. Because such tap water does not contain sufficient minerals and is stagnant water, in which water does not flow, it cannot provide purifying effect and is polluted easily.

Therefore, in order to solve the problems, people need a water quality converter, which is good for health and preserves the water quality for a long time with purification capacity even though raw water, such as tap water, is used.

SUMMARY OF THE INVENTION

Accordingly, the present invention has been made to solve the above-mentioned problems occurring in the prior arts, and it is an object of the present invention to provide a water quality converter that can easily convert water quality by a very simple method.

To accomplish the above object, according to the present invention, there is provided a water quality converter, which can provide minerals to raw water and preserve raw water conditions for a long time, the water quality converter including: a container which has an oval hollow so that raw water passes therethrough, wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed, wherein a weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5, wherein a total content of germanium, Shungite and elvan is 30% to 40% by weight, and a total content of rose crystal, seven-colored stone and wooden stone is 10% to 20% by weight, wherein the container is 15 cm to 30 cm in length which is a raw water passage, an area of a hollow through which the raw water passes is 40 $cm^2$ to 100 $cm^2$, an aspect ratio (major axis/minor axis) of the hollow is ½ or ⅕, an average thickness of the container from the inner surface of the hollow to the outer surface of the container is 3 cm to 10 cm, and a thickness difference between the thickest part of the container and the thinnest part of the container is 0.01 cm to 2 cm, and wherein the container includes a first main body and a second main body which are combined with each other mechanically and each of which has a part of the hollow in a direction of the cross section.

In another aspect of the present invention, there is provided a water quality converter for a fishbowl, which can provide minerals to water while the water is being supplied to a fishbowl and convert the water quality to preserve raw water conditions for a long time, the water quality converter for a fishbowl including: a container which has an oval hollow so that raw water passes therethrough, wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed, wherein a weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5, wherein a total content of germanium, Shungite and elvan is 30% to 40% by weight, and a total content of rose crystal, seven-colored stone and wooden stone is 10% to 20% by weight, wherein the container is 15 cm to 30 cm in length which is a raw water passage, an area of a hollow through which the raw water passes is 40 $cm^2$ to 100 $cm^2$, an aspect ratio (major axis/minor axis) of the hollow is ½ to ⅕, an average thickness of the container from the inner surface of the hollow to the outer surface of the container is 3 cm to 10 cm, and a thickness difference between the thickest part of the container and the thinnest part of the container is 0.01 cm to 2 cm, and wherein the container includes a first main body and a second main body which are combined with each other mechanically and each of which has a part of the hollow in a direction of the cross section.

The water quality converter according to the present invention contains specific materials with specific contents, can provide minerals to raw water by a simple method to make raw water pass a container of a structure that satisfies specific conditions, and prevents pollution of the water in spite of preservation for a long time.

Therefore, the water quality converter according to the present invention is good for human health, helps health, growth and development of fish, and is effective since it does not pollute water in spite of preservation for a long time and it does not need a frequent water change.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
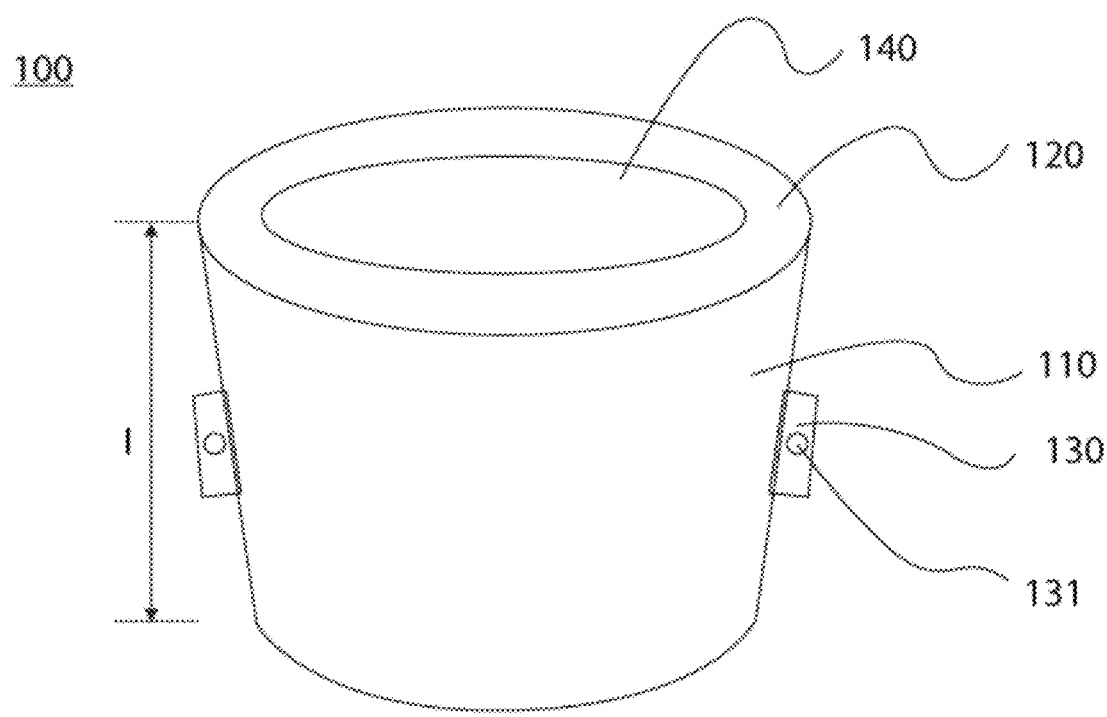
FIG. 1 is a perspective view of a water quality converter according to a preferred embodiment of the present invention.

Hereinafter, preferred embodiments of a water quality converter according to the present invention will be described in detail with reference to the accompanying drawings. However, it will be understood by those skilled in the art that the scope of the present disclosure is not limited by the embodiments.

A water quality converter according to a preferred embodiment of the present invention, which can provide minerals to raw water and preserve raw water conditions for a long time, includes: a container which has an oval hollow so that raw water passes therethrough, wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed.

A weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5.

A total content of germanium, Shungite and elvan is 30% to 40% by weight, and a total content of rose crystal, seven-colored stone and wooden stone is 10% to 20% by weight.

The container is 15 cm to 30 cm in length which is a raw water passage, an area of a hollow through which the raw water passes is 40 cm$^2$ to 100 cm$^2$, an aspect ratio (major axis/minor axis) of the hollow is ½ or ⅕, an average thickness of the container from the inner surface of the hollow to the outer surface of the container is 3 cm to 10 cm, and a thickness difference between the thickest part of the container and the thinnest part of the container is 0.01 cm to 2 cm.

The container includes a first main body and a second main body which are combined mechanically and each of which has a part of the hollow in a direction of the cross-section.

Moreover, a water quality converter for a fishbowl according to another preferred embodiment of the present invention, which can provide minerals to water supplied to a fishbowl and preserve raw water conditions for a long time, includes: a container which has an oval hollow so that raw water passes therethrough, wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed.

A weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5.

A total content of germanium, Shungite and elvan is 30% to 40% by weight, and a total content of rose crystal, seven-colored stone and wooden stone is 10% to 20% by weight.

The container is 15 cm to 30 cm in length which is a raw water passage, an area of a hollow through which the raw water passes is 40 cm$^2$ to 100 cm$^2$, an aspect ratio (major axis/minor axis) of the hollow is ½ or ⅕, an average thickness of the container from the inner surface of the hollow to the outer surface of the container is 3 cm to 10 cm, and a thickness difference between the thickest part of the container and the thinnest part of the container is 0.01 cm to 2 cm.

The container includes a first main body and a second main body which are combined with each other mechanically and each of which has a part of the hollow in a direction of the cross section.

That is, the water quality converter can achieve the object of the present invention by a very simple method that provides minerals to raw water and maintains the state of the raw water for a long time through purification just by the raw water's passing through the hollow.

When the raw water passes through the container, the minerals released from the surface by friction, and the quality of the raw water is converted into water quality containing minerals by magnetism generated from the minerals so as to be purified and improved.

In this instance, in order to provide sufficient minerals to the raw water so that the raw water containing the minerals is helpful to promote health of human bodies or fish and to purify the raw water, the above-mentioned materials must have the above content.

Of course, other than the above mixture, other mineral matters of a small amount may be added.

If the content of the materials deviate of the above-mentioned ranges, namely, if the materials are too small, the effects of the present invention cannot be achieved, but if the materials are included excessively, it is not preferable since the content of other minerals is reduced. That is, in order to achieve the effects of the present invention, it is preferable to contain the materials with more than suitable content.

The aventurine is a silicate mineral, and consists of $SiO_4$-type of large anions and metal-type of small cations. A silicon ion is tetrahedrally surrounded by four oxygen ions which are four times higher than the silicon ion. Such an aventurine blocks electromagnetic waves, has an antibacterial effect, and supplies essential minerals.

The sodalite is a cubic mineral and is produced from volcanic rocks and plutonic rocks containing a plenty of alkali in order to convert the raw water into alkaline water.

The amethyst is a variated mineral of quartz. Such amethyst neutralizes harmful substances, emits far-infrared rays, and helps to discharge wastes so as to contribute to the preservation of the raw water.

The Chungito is a mica-based natural clay mineral, emits a plenty of anions and far-infrared rays, and supplies essential minerals. The germanium purifies the raw water and decomposes organic matter.

The Shungite is a rock containing silicate and fullerene, serves as a filter, and serves to purify the raw water.

The elvan contains silicic acid anhydride and aluminum oxide as main ingredients, serves as a filtering agent, and removes inflammation and harmful metals.

The rose crystal is quartz of a rose-red color or a rose pink color, and provides essential minerals. The seven-colored stone provides far-infrared rays. The wooden stone is a stone that a lignin part is converted into a stone through an exchange with silicon dioxide of underground water after a tree is buried under the ground rapidly.

If any one among the above-mentioned materials is not contained, since the water cannot contain minerals of the intended level or purified raw water cannot be obtained, it is difficult to use the water as drinking water, and the water is rapidly polluted when being used as water for a fishbowl.

Furthermore, the weight ratios of the materials are also important factors. All of the materials carry out their roles. In order to achieve the effects of the present invention, weight ratio of aventurine to sodalite ranges from 3:1 to 1:1, the weight ratio of aventurine to germanium ranges from 2:1 to 1:1, the weight ratio of germanium to Shungite ranges from 4:1 to 1:2, and the weight ratio of amethyst to germanium ranges from 1:2 to 1:5. The total content of germanium, Shungite and elvan is 30% to 40% by weight, and the total content of rose crystal, seven-colored stone and wooden stone is 10% to 20% by weight.

In more detail, preferably, the weight ratio of aventurine to sodalite ranges from 2:1 to 1:1, the weight ratio of aventurine to germanium ranges from 1.5:1 to 1:1, the weight ratio of germanium to Shungite ranges from 4:1 to 2:1, the weight ratio of amethyst to germanium ranges from 1:2 to 1:3, the total content of germanium, Shungite and elvan is 30% to 35% by weight, and the total content of rose crystal, seven-colored stone and wooden stone is 15% to 20% by weight.

If the content of the materials deviate of the above-mentioned ranges, the preservation capacity of the raw water is deteriorated.

In the meantime, besides such materials forming the container, in order to achieve the intended effects of the present invention, the structure of the container plays an important role.

That is, the water quality converter according to the present invention is easy to manufacture since being a simple device just having the hollow therein.

In this instance, the hollow is oval in a cross-sectional area. The oval shape facilitates a flow of water, and is good for sanitary reasons since there is no angled part. Additionally, in comparison with a round shape, the oval shape makes the materials flow out easily and makes the raw water contain the maximum minerals while passing through the container since minimizing a distance from a part where the raw water getting in contact with the container to the central point of the raw water.

In addition, the container has a structure that the first main body and the second main body each of which has a part of the hollow are combined mechanically.

The container has a shape that the hollow is cut in half in a longitudinal direction from the central portion of the hollow in order to be washed easily, namely, a structure to form the hollow when the first main body having a part of the hollow and the second main body having the other part of the hollow are combined with each other, for instance, a semicylindrical shape.

Moreover, the combination is not limited if it has any mechanical form, but the container may have a structure that through-holes are formed at combining parts protruding from sides of the first main body and the second main body and are assembled integrally by nuts.

FIG. 1 is a perspective view showing a water quality converter according to a preferred embodiment of the present invention.

Referring to FIG. 1, the water quality converter 100 according to the preferred embodiment of the present invention includes a first main body 110 and a second main body 120 having a semicylindrical shape. The first main body 110 and the second main body 120 are combined by through-holes 131 formed in the combining parts 130 using nuts so as to form a hollow 240 therein.

In this instance, preferably, the combining parts 130 can be disassembled so that the inside of the hollow can be washed easily.

Meanwhile, because the effects of the present invention can be achieved by the simple method that the raw water passes through the hollow formed therein without any additional device, the length that the raw water passes, the area, the aspect ratio and the roughness of the hollow, and thickness and form of the container emitting minerals may have influences on the effects of the present invention. That is, the effects of the present invention may be achieved just when such conditions are satisfied.

Figure 2:
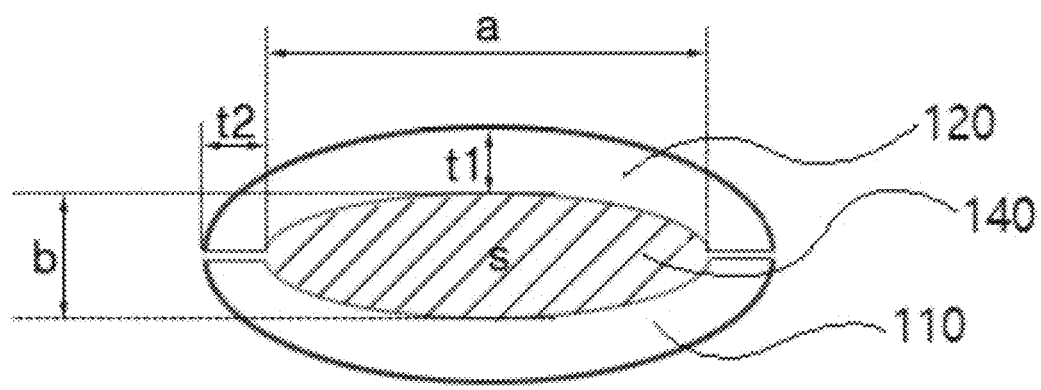
FIG. 2 is a top view of the water quality converter of FIG. 1.

Referring to FIGS. 1 and 2, the structure of the present invention will be described. FIG. 2 is a mimetic top view of the water quality converter 100 of FIG. 1.

First, referring to FIG. 1, in order to show the effects of the present invention, a length l of the water quality converter 100 corresponding to the length of the raw water passage is 15 cm to 30 cm, preferably, 15 cm to 25 cm, and more preferably, 20 cm to 25 cm.

If the water quality converter 100 is too short, it is difficult to supply minerals sufficiently and the water quality converter cannot provide a sufficient purifying action since the raw water passage becomes short. If the water quality converter 100 is too long, it takes a long time to convert the quality of the raw water due to an increase of weight and volume, and it is inefficient since a rate of cost increase to effect is high due to a limitation in a number of minerals contained in the raw water.

Figure 3:
FIG. 3 is a photograph of a water quality converter according to another preferred embodiment of the present invention.

Meanwhile, it is important that the width of the hollow 140 is equal to a raw water passing area. Referring to FIG. 3, an area (S) of the hollow 140 through which the raw water passes is 40 $cm^2$ to 100 $cm^2$, preferably, 50 $cm^2$ to 90 $cm^2$, and more preferably, 60 $cm^2$ to 80 $cm^2$.

If the area of the hollow is too narrow, because the raw water passing area becomes too narrow, it is inefficient since it takes a long time to convert the water quality. If the area of the hollow is too wide, because lots of raw water passes altogether, the water quality converter cannot make more minerals melt into the water and cannot sufficiently purify the raw water flowing therein.

Furthermore, the water quality converter 100 according to the present invention has the hollow of an oval shape in order to show the effects of the present invention maximally, and its aspect ratio (b/a) is ½ to ⅕, preferably, ½ to ⅓.

If the aspect ratio is too high, the water quality converter cannot show the effects of the present invention manufactured in the oval shape since the hollow becomes almost circular. If the aspect ratio is too low, the raw water cannot flow smoothly.

In the meantime, it is important to determine the thickness of the container, which supplies minerals for converting water quality and purifying the raw water, as well as the length of the container and the area of the hollow to determine a flow amount and a flow length of the raw water.

In detail, referring to FIG. 3, the thickness (t) of the container, namely, the first main body 110 and the second main body 120, may be designed in consideration of volume and weight to supply minerals. In this instance, the thickness (t) means an average of thicknesses (t1, t2) at two points which are designated at random, and in detail, the thickness (t) is 3 cm to 10 cm, preferably, 3 cm to 7 cm, and more preferably, 5 cm to 7 cm.

If the container is too thin, it is difficult to sufficiently supply minerals and sufficiently provide the purifying action. If the container is too thick, it is inefficient since volume and weight become excessive, and there is a limitation in the improvement of mineral supplying effect and purifying effect.

Additionally, a thickness difference between the thickness (t1) at the thickest part and the thickness (t2) at the thinnest part of the container is 0.01 cm to 2 cm, preferably, 0.1 cm to 1 cm.

If the thickness difference is too large, there are mechanical problems and an increase in manufacturing costs.

Therefore, the water quality converter according to the present invention can convert water quality maximally when satisfying the conditions of the present invention.

Meanwhile, in order to supply minerals smoothly and purify the raw water smoothly, the surface area that the raw water gets in contact with the container may be widened. For instance, the average roughness of the inner surface of the hollow of the container is 0.01 cm to 1cm.

Because the inner surface of the hollow is a part that the raw water gets in direct contact with the hollow, the roughness of the inner surface may be an area that the raw water gets in contact. So, a smooth flow of the raw water and manufacturing efficiency must be considered.

In this instance, the roughness is measured using a contact 3D roughness meter (SE500 manufactured by KOSAKA company), and is an average value obtained by measuring a standard measuring length of 0.08 cm five times.

Hereinafter, the water quality converter according to the present invention will be described in more detail, but the following embodiments are just exemplary, and the scope of the present invention is not limited by the embodiments.

Embodiment 1

The water quality converter (length: about 20 cm, area of the hollow: about 58 cm$^2$, an aspect ratio of the hollow: ½, average thickness between the thickest part and the thinnest part: about 7 cm, and thickness difference: 0.5 cm) was prepared as illustrated in FIG. 3.

The water quality converter was manufactured through the steps of mixing 20% by weight of aventurine powder, 15% by weight of sodalite powder, 7% by weight of amethyst powder, 10% by weight of Chungito powder, 18% by weight of germanium powder, 5% by weight of Shungite powder, 9% by weight of elvan powder, 8% by weight of rose crystal powder, 4% by weight of seven-colored gemstone powder, and 4% by weight of wooden stone powder to prepare mixture powder, putting, pulverizing and stirring water into the mixture powder, and molding, milling and drying into a model of FIG. 3, and firing in an electric furnace at 1000° C. for six hours.

The raw water (tap water) was kept at room temperature for one day, and water A for a fishbowl was prepared by passing through the hollow of the water quality converter.

Comparative Example 1

The raw water (tap water) was kept at room temperature for one day, and water B for a fishbowl was prepared without any treatment.

Comparative Example 2

The same water quality converter as the embodiment 1 was manufactured except that mixture powder, in which 10% by weight of aventurine powder, 10% by weight of sodalite powder, 10% by weight of amethyst powder, 10% by weight of Chungito powder, 10% by weight of germanium powder, 10% by weight of Shungite powder, 10% by weight of elvan powder, 10% by weight of rose crystal powder, 10% by weight of seven-colored gemstone powder, and 10% by weight of wooden stone powder were mixed. The raw water (tap water) was kept at room temperature for one day, and water C for a fishbowl was prepared by passing through the hollow of the water quality converter.

Comparative Example 3

The same water quality converter as the embodiment 1 was manufactured except that Shungite was not contained and 20% by weight of sodalite powder was mixed. The raw water (tap water) was kept at room temperature for one day, and water D for a fishbowl was prepared by passing through the hollow of the water quality converter.

Comparative Example 4

The same water quality converter as the embodiment 1 was manufactured except that amethyst was not contained, 70% by weight of Shungite and 14% by weight of elvan were mixed. The raw water (tap water) was kept at room temperature for one day, and water E for a fishbowl was prepared by passing through the hollow of the water quality converter.

Comparative Example 5

The same water quality converter as the embodiment 1 was manufactured except that 20% by weight of amethyst, 20% by weight of Chungito, 20% by weight of germanium, 20% by weight of Shungite and 20% by weight of elvan were mixed. The raw water (tap water) was kept at room temperature for one day, and water F for a fishbowl was prepared by passing through the hollow of the water quality converter.

Comparative Example 6

The same water quality converter as the embodiment 1 was manufactured except that the length of the water quality converter was halved (length: about 10 cm, area of the hollow: about 58 cm$^2$, average thickness between the thickest part and the thinnest part: about 7 cm). The raw water (tap water) was kept at room temperature for one day, and water G for a fishbowl was prepared by passing through the hollow of the water quality converter.

Experimental Example 1

Figure 4:
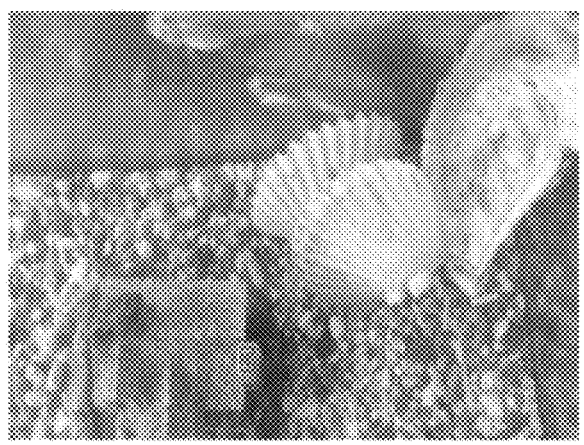
FIG. 4 is a photograph showing a result of an experimental example of the present invention.
Figure 5:
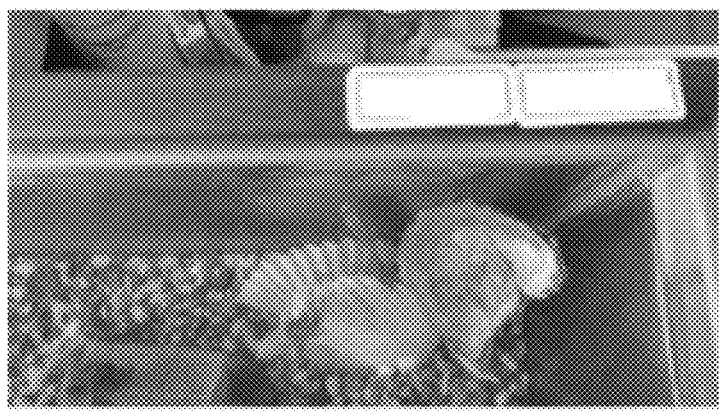
FIG. 5 is a photograph showing a result of a comparative example of the present invention.

Fishbowls of 30*20*24 were made as shown in FIGS. 4 and 5 using the water A for the fishbowl prepared in the embodiment 1 and the water B, the water C, the water D, the water E, the water F and the water G for fishbowls prepared in the comparative examples 1 to 6, and then, three guppies were put in each of the fishbowls. After one month, the water quality states of the fishbowls were compared, and the compared results were shown in FIGS. 4 and 5 and the following Table 1.

FIG. 4 is a photograph of the embodiment 1, and FIG. 5 is a photograph of the comparative example 1.

Moreover, Table 1 shows the polluted level by comparing the turbidity level of water when the pollution level of the fishbowl in the embodiment 1 is 1 and when the pollution level of the fishbowl in the comparative example 1 is 5.

The comparison was made through the steps of observing the color level of A4 paper put behind each fishbowl and the degree of residues accumulated on tangerine peels and dividing the color level and the degree of residues into 1 to 5, and the comparison results are as follows.

That is, the raw water was purified excellently only when passing through the water quality converter according to the present invention.

It will be understood by those of ordinary skill in the art that various changes, modifications and equivalents may be made in the present invention without departing from the technical scope and idea of the present invention.

What is claimed is:

1. A water quality converter, which can provide minerals to raw water and preserve raw water conditions for a period of time, the water quality converter comprising:
    a container which has an oval hollow so that raw water passes therethrough,
    wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed,
    wherein a weight ratio of aventurine to sodalite ranges from 3:1 to 1:1, a weight ratio of aventurine to germa-

TABLE 1

| | Container Length | Material (% by weight) | | | | | | | | | | Pollution level |
|---|---|---|---|---|---|---|---|---|---|---|---|---|
| | | Aventurine | Sodalite | Amethyst | Chungito | Germanium | Shungite | Elvan | Rose crystal | Seven-colored | Wooden stone | |
| Embodiment1 | 20 cm | 20 | 15 | 7 | 10 | 18 | 5 | 9 | 8 | 4 | 4 | 1 |
| Comparative Example1 | | — | — | — | — | — | — | — | — | — | — | 5 |
| Comparative Example2 | | 10 | 10 | 10 | 10 | 10 | 10 | 10 | 10 | 10 | 10 | 3 |
| Comparative Example3 | | 20 | 20 | 7 | 10 | 18 | — | 9 | 8 | 4 | 4 | 3 |
| Comparative Example4 | | 20 | 15 | — | 10 | 18 | 7 | 14 | 8 | 4 | 4 | 3 |
| Comparative Example5 | | — | — | 20 | 20 | 20 | 20 | 20 | — | — | — | 5 |
| Comparative Example6 | 10 cm | 20 | 15 | 7 | 10 | 18 | 5 | 9 | 8 | 4 | 4 | 4 |

*1: Water is clear and there is no residue, 2: The color of water is changed a little, 3: The color of the water is changed a little and a few residues exist, 4: The color of the water becomes murky and lots of residues exist prominently.

Referring to FIGS. 4 and 5, when the water obtained by passing the water quality converter according to the embodiment of the present invention was used, it was confirmed that the surface of the tangerine peels in the fishbowl was clean and there was little change in water quality. However, when the water obtained through the comparative examples was used, it was confirmed that the color of the water became murky and lots of wastes were formed on the surface of the tangerine peels.

Referring to Table 1, when the conditions of the present invention were satisfied, the water quality converter according to the present invention showed excellent purifying action. However, if the content ratios of the materials contained in the water quality converter of the present invention were not satisfied, if some of the materials were excluded, or if the container through which the raw water passed was too short, the water quality converter was deteriorated in purifying capacity and the quality of the raw water became worse.

nium ranges from 2:1 to 1:1, a weight ratio of germanium to Shungite ranges from 4:1 to 1:2, and a weight ratio of amethyst to germanium ranges from 1:2 to 1:5,
    wherein the total content of germanium, Shungite and elvan is 30% to 40% by weight, and a total content of rose crystal, seven-colored stone and wooden stone is 10% to 20% by weight,
    wherein the container is 15 cm to 30 cm in length which is a raw water passage, an area of a hollow through which the raw water passes is 40 cm$^2$ to 100 cm$^2$, an aspect ratio (major axis/minor axis) of the hollow is ½ to ⅕, an average thickness of the container from the inner surface of the hollow to the outer surface of the container is 3 cm to 10 cm, and a thickness difference between a thickest part of the container and a thinnest part of the container is 0.01 cm to 2 cm, and
    wherein the container includes a first main body and a second main body which are combined with each other mechanically and each of which has a part of the hollow in a direction of the cross section.

2. A water quality converter for a fishbowl, which can provide minerals to water while the water is being supplied to a fishbowl and convert the water quality to preserve water for a period of time, the water quality converter for a fishbowl comprising:
   a container which has an oval hollow so that raw water passes therethrough,
   wherein the container is a plastic body of a mixture in which 10% to 30% by weight of aventurine, 5% to 20% by weight of sodalite, 2% to 10% by weight of amethyst, 1% to 10% by weight of Chungito, 5% to 20% by weight of germanium, 2% to 10% by weight of Shungite, 3% to 10% by weight of elvan, 2% to 10% by weight of rose crystal, 1% to 5% by weight of seven-colored gemstone, and 1% to 5% by weight of wooden stone are mixed,
   wherein a weight ratio of aventurine to sodalite ranges from 3:1 to 1:1, a weight ratio of aventurine to germanium ranges from 2:1 to 1:1, a weight ratio of germanium to Shungite ranges from 4:1 to 1:2, and a weight ratio of amethyst to germanium ranges from 1:2 to 1:5,
   wherein a total content of germanium, Shungite and elvan is 30% to 40% by weight, and a total content of rose crystal, seven-colored stone and wooden stone is 10% to 20% by weight,
   wherein the container is 15 cm to 30 cm in length which is a raw water passage, an area of a hollow through which the raw water passes is 40 $cm^2$ to 100 $cm^2$, an aspect ratio (major axis/minor axis) of the hollow is ½ to ⅕, an average thickness of the container from the inner surface of the hollow to the outer surface of the container is 3 cm to 10 cm, and a thickness difference between a thickest part of the container and a thinnest part of the container is 0.01 cm to 2 cm, and
   wherein the container includes a first main body and a second main body which are combined with each other mechanically and each of which has a part of the hollow in a direction of the cross section.

\* \* \* \* \*